(12) United States Patent
Takayama et al.

(10) Patent No.: US 9,948,844 B2
(45) Date of Patent: Apr. 17, 2018

(54) PERIODIC MOTION OBSERVATION SYSTEM

(71) Applicant: Sunkiko Co., Ltd., Shiga (JP)

(72) Inventors: Mitsuru Takayama, Shiga (JP); Yasuhiko Hayashi, Kyoto (JP)

(73) Assignee: Sunkiko Co., Ltd., Shiga (JP)

( * ) Notice: Subject to any disclaimer, the term of this patent is extended or adjusted under 35 U.S.C. 154(b) by 0 days.

(21) Appl. No.: 15/506,875

(22) PCT Filed: Aug. 31, 2015

(86) PCT No.: PCT/JP2015/074604
§ 371 (c)(1),
(2) Date: Feb. 27, 2017

(87) PCT Pub. No.: WO2016/035736
PCT Pub. Date: Mar. 10, 2016

(65) Prior Publication Data
US 2017/0257542 A1 Sep. 7, 2017

(30) Foreign Application Priority Data
Sep. 2, 2014 (JP) .................. 2014-178435

(51) Int. Cl.
*H04N 5/225* (2006.01)
*H04N 9/31* (2006.01)
(Continued)

(52) U.S. Cl.
CPC ....... *H04N 5/2256* (2013.01); *H04N 5/23254* (2013.01); *H04N 9/3155* (2013.01); *H04N 5/23229* (2013.01); *H05B 37/00* (2013.01)

(58) Field of Classification Search
CPC ........... H04N 9/3155; H04N 2209/044; H04N 5/2256; H04N 5/23229; H04N 5/23254; H05B 37/00
See application file for complete search history.

(56) References Cited

U.S. PATENT DOCUMENTS 8,098,317 B2    1/2012  Takahashi et al.
8,253,849 B2 *  8/2012  Chuang .................. G03B 7/16
                                              348/361
(Continued)

FOREIGN PATENT DOCUMENTS

JP   2009-100326 A   5/2009
JP   2013-101086 A   5/2013

OTHER PUBLICATIONS

International Search Report dated Nov. 24, 2015 issued in corresponding PCT/JP2015/074604 application (1 page).
(Continued)

*Primary Examiner* — Hung Lam
(74) *Attorney, Agent, or Firm* — Millen, White, Zelano & Branigan, P.C.; William Nixon (57) ABSTRACT

A periodic motion observation system specifies, with high accuracy, the locus, speed, and a place in which strain, etc., that occurs in the periodic motion of an observation target. A flash light is emitted every prescribed period from a light source. The periodic motion at a prescribed observation point of an observation target is image-captured by an image-capturing camera. The image pertaining to the periodic motion at the prescribed observation point of the observation target is analyzed by an image analysis device. This image analysis unit extracts, on the basis of the image pertaining to the periodic motion at the prescribed observation point of the observation target, the coordinates of the prescribed observation point at a time when the prescribed observation point of the observation target is irradiated by the light source, and outputs each of the coordinates in tabular form or graphic form.

6 Claims, 11 Drawing Sheets

(51) Int. Cl.
*H04N 5/232* (2006.01)
*H05B 37/00* (2006.01)

(56) References Cited

U.S. PATENT DOCUMENTS

| | | | | |
|---|---|---|---|---|
| 8,269,855 B2* | 9/2012 | Amir | ............ | H04N 9/646 |
| | | | | 348/229.1 |
| 8,334,898 B1* | 12/2012 | Ryan | ............ | G01C 21/206 |
| | | | | 348/61 |
| 2009/0102938 A1 | 4/2009 | Takahashi et al. | | |
| 2012/0257085 A1* | 10/2012 | Matsumoto | ............ | H04N 1/3876 |
| | | | | 348/239 |
| 2016/0112622 A1* | 4/2016 | Gressum | ............ | G03B 15/02 |
| | | | | 348/370 |
| 2016/0182788 A1* | 6/2016 | Wan | ............ | H04N 5/23219 |
| | | | | 348/370 |
| 2017/0127025 A1* | 5/2017 | Damberg | ............ | H04N 9/312 |

OTHER PUBLICATIONS

English Abstract of JP 2009-100326 A published May 7, 2009.
English Abstract of JP 2013-101086 A published May 23, 2013.

* cited by examiner

Fig. 5A Light emission period time

Fig. 5B Light emission phase value

Fig. 5C Light emission start position
Initial position (light emission phase 0)
Recognition mark
Observation Target M

Fig. 5D Light emission start value
Phase movement (light emission phase +1)

Fig. 5E Light emission start position
Phase movement (light emission phase +2)

Fig. 6A Light emission period time

Fig. 6B Light emission Luminance adjustment (Low)

Fig. 6C Light emission Luminance adjustment (High)

# PERIODIC MOTION OBSERVATION SYSTEM

TECHNICAL FIELD

The present invention relates to a periodic motion observation system for observing a periodic motion of a prescribed observation point of an observation target by emitting a flash light from a light source to irradiate the observation target in a periodic motion.

BACKGROUND ART

The so-called strobe effect is used in various fields, in which an observation target is observed in a stationary state or in a slowly moving slow motion state by emitting a flash light for a moment from a light source to irradiate the observation target in a periodic motion while repeating the emission of the flash light at a constant period. For example, as an observation target, in addition to a motor that rotates at a high speed in a constant period, a printer, a fuel ejecting device, etc., in which liquid droplets are ejected in a constant period and fly at a prescribed speed, can be exemplified.

By the way, as a method for observing an observation target that perform a periodic motion at a high speed, a method using the so-called high speed camera is known. In a high speed camera, an observation target is image-captured with more frames than a normal camera, and therefore the observation target can be observed in a stationary state or in a slowly moving state. However, since such a high-speed camera is expensive, it is difficult to feel free to observe the observation target in a periodic motion, causing an increased observation cost.

For this reason, various methods for observing an observation target in a periodic motion using a stroboscopic effect without using a high-speed camera have been conventionally proposed.

For example, Patent Document 1 discloses a light emission control device configured to move an observation/image-capturing target by shifting the light emission start time. The light emission control device not only moves an observation/image-capturing target to a prescribed position by shifting the light emission start time, but also move the observation/image-capture target for a long time covering a plurality of periods. With this, it is possible to continuously observe and image-capture a target 22 at a speed slower than the actual speed over a long period of time.

Further, Patent Document 2 discloses a droplet observation device in which a control means 6 generates a strobe irradiation signal after a delay time (T+α) (the time indicated by T+α in FIG. 4), makes the flash light irradiation section irradiate a flash light to a droplet, and repeats the same control, so that an image that looks as if the same droplet 200 is photographed by a high-speed camera and is moving (flying) sequentially can be obtained.

Furthermore, Patent Document 3 discloses an image capturing method in which a light source emits a light every time a signal is sent to irradiate a diesel spray, and the light emission start time from the injection is extended every injection by the delay time interval, so when the observation or the image-capturing is performed in a dark room, the spray 4 can be observed as if it is slowly developing.

PRIOR ART

Patent Document

Patent Document 1: Japanese Unexamined Patent Application Publication No. 2013-61378

Patent Document 2: Japanese Unexamined Patent Application Publication No. 2005-69835

Patent Document 2: Japanese Unexamined Patent Application Publication No. H08-271956

SUMMARY OF THE INVENTION

Problems to be Solved by the Invention

However, all of the observation methods using a stroboscopic effect merely enabled a visually observation of an observation target in a periodic motion in a stationary state or in a slowly moving slow motion state. For this reason, even in cases where the movement speed of the observation target changes significantly or the locus of the observation target greatly deviates, a visual observation may be still possible. However, there was a problem that it was difficult to specify, with high accuracy, the locus, the speed, and the place where strain, etc., has occurred on a periodic motion of the observation target.

The present invention was made in view of the aforementioned problems (technical background), and the purpose of the present invention is to provide a periodic motion observation system capable of specifying, with high accuracy, the locus, the speed, and the place where strain, etc., has occurred on the periodic motion of an observation target with simple configuration.

Means for Solving the Problems

In order to attain the aforementioned objects, the present invention includes a light source configured to emit a flash light every prescribed period to irradiate an observation target in a periodic motion, a light emission control device configured to control emission of the light source, an image-capturing camera configured to image-capture the periodic motion of a prescribed observation point of the observation target irradiated by the light source, and an image analysis device configured to analyze an image of the periodic motion of the prescribed observation point of the observation target image-captured by the image-capturing camera. The light emission control device includes a light emission period generation unit configured to generate alight emission period of the light source to synchronize to the periodic motion of the observation target, a light emission phase generation unit configured to generate a plurality of light emission phases by dividing the light emission period of the light source and add or subtract the light emission phases to thereby move a light emission start position of the light source to a prescribed light emission phase value in order, and a light emission signal generation unit configured to generate a light emission signal that sequentially makes the light source emit at each light emission start position sequentially moved to the prescribed light emission phase value by the light emission phase generation unit in the light emission period generated by the light emission period generation unit. The image analysis device includes an observation point coordinate extraction unit configured to extract a coordinate of the observation point when the prescribed observation point of the observation target is irradiated by the light source, based on the image related to the periodic motion of the prescribed observation point of the observation target image-captured by the image-capturing camera, and an observation point coordinate output unit configured to output each coordinate of the prescribed observation point of the observation target extracted by the observation point coordinate extraction unit in tabular form or graphic form. According to this, it is possible to specify, with high accuracy, the locus, the speed, the place where strain, etc., has occurred on the periodic motion of the observation target with simple configuration.

Further, it may be configured such that the light emission control device includes a light emission luminance generation unit that generates light emission luminance of the light source by adjusting a light emission time ratio within a light emission time of the light source, and the light emission luminance generated by the light emission luminance generation unit is output to the light emission signal generation unit.

Also, it may be configured such that the light emission phase generation unit of the light emission control device makes the light emission start position of the light source wait at the prescribed light emission phase value based on a prescribed phase waiting time.

Further, it may be configured such that the light emission phase generation unit of the light emission control device specifies the light emission phase value corresponding to an initial light emission start position of the light source according to an initial phase value of the motion period of the observation target.

Further, it may be configured such that the image analysis device include an image processing unit that processes the image related to the periodic motion of the observation point of the observation target image-captured by the image-capturing camera to obtain an analysis image based on at least one of parameters of a hue, a saturation, a brightness, a presence or absence of smoothing, a presence or absence of edge detection, and an edge threshold.

Furthermore, it may be configured such that the image analysis device includes an image rasterizing unit that obtains an analysis image on a two-dimensional surface by one-dimensionally scanning an image related to the periodic motion of the observation point of the observation target image-captured by the image-capturing camera at a point and then scanning at a line in a direction perpendicular to the one-dimensional scanning.

Effects of the Invention

According to the present invention, it is possible to observe the periodic motion of the observation target with simple configuration without using an expensive apparatus, such as, e.g., a high speed camera. Moreover, since each coordinate of the observation point of the observation target is output in tabular form or graphic form, it is possible to identify, with high accuracy, the locus, the speed, the place where strain, etc., has occurred on the periodic motion of the observation target. For this reason, in addition to the high-speed rotating motor, in each technical field of, such as, e.g., a printer and a fuel ejecting apparatus in which droplets are ejected at a constant cycle and fly at a prescribed speed, it is possible to find various abnormalities of the observation target and easily and reliably investigate the cause of the abnormality while keeping the cost low.

EMBODIMENT FOR CARRYING OUT THE INVENTION

Next, an embodiment of a periodic motion observation system according to the present invention will be described with reference to FIGS. 1 to 11.

[Overall Configuration]

Figure 1:
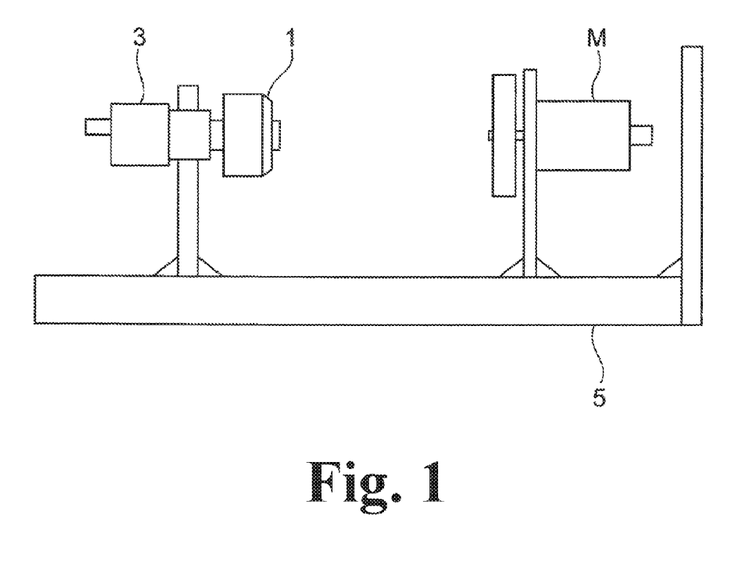
FIG. 1 is a schematic configuration view showing a mechanical configuration of this system.
Figure 2:
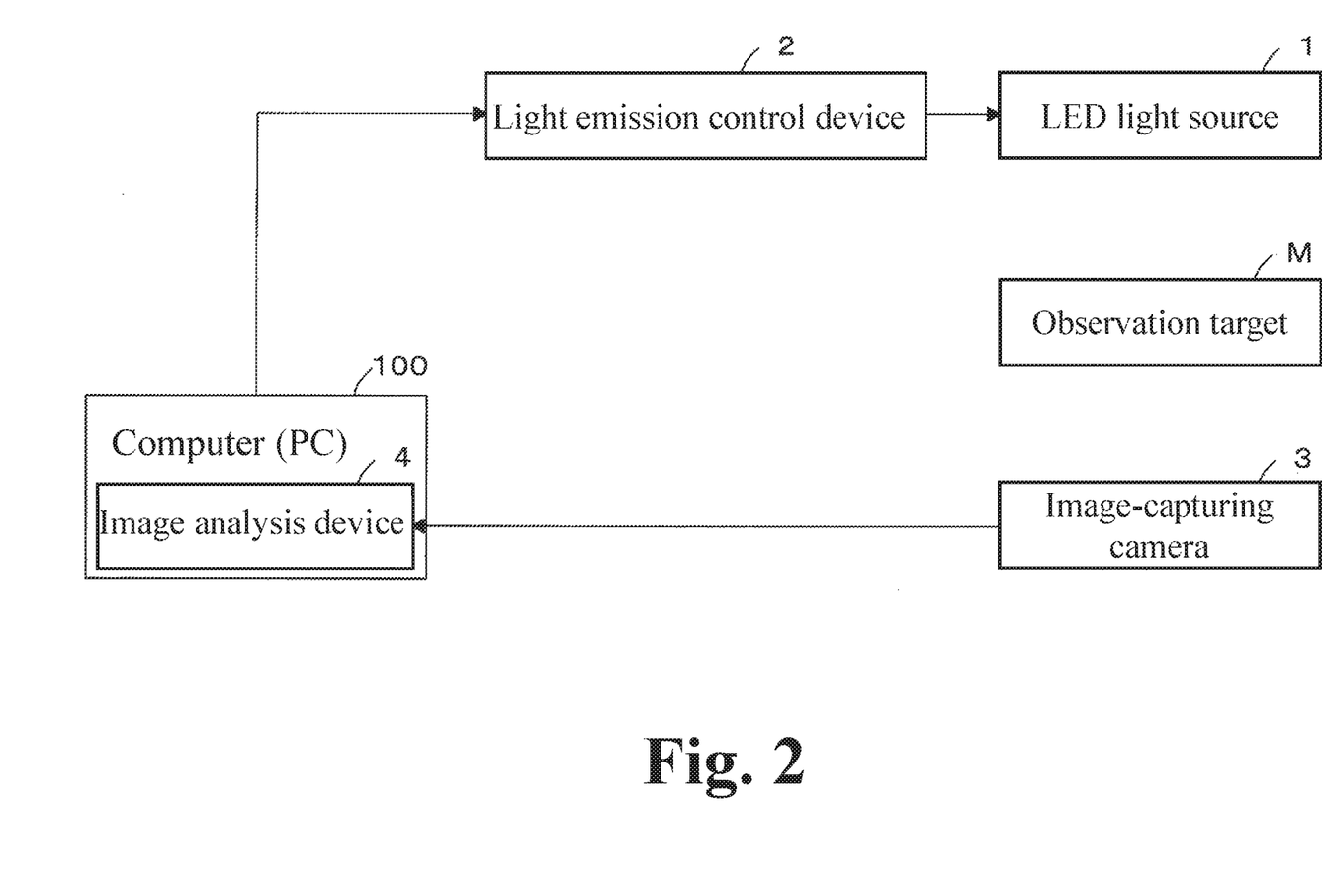
FIG. 2 is a block diagram showing an electrical configuration of this system.

FIG. 1 is a schematic configuration view showing a mechanical configuration of a periodic motion observation system (hereinafter referred to as "present system") according to this embodiment. Further, FIG. 2 is a block diagram showing an electrical configuration of this system.

This system is configured to observe a rotation state of a DC motor as an observation target M rotating at high speed at a prescribed period. The system includes an LED light source 1 that emits a flash light at a prescribed period to irradiate the observation target, a light emission control device 2 that controls the light emission period, the light emission time, etc., of the LED light source 1, an image-capturing camera 3 that image-captures the observation target M to which the flash light is irradiated by the LED light source 1, and an image analysis device 4 that analyzes the image of the observation target M image-captured by the image-capturing camera 3.

In this embodiment, as shown in FIG. 1, the observation target M is fixed to the base 5, and the LED light source 2 and the image-capturing camera 3 are coaxially fixed to the base 5 so as to face the observation target M. The reference numeral "100" denotes a computer, such as, e.g., a PC (personal computer), connected to the light emission control device 2, and the computer has a function as an image analysis device 4 therein.

[Configuration of Light Emission Control Device]

Figure 3:
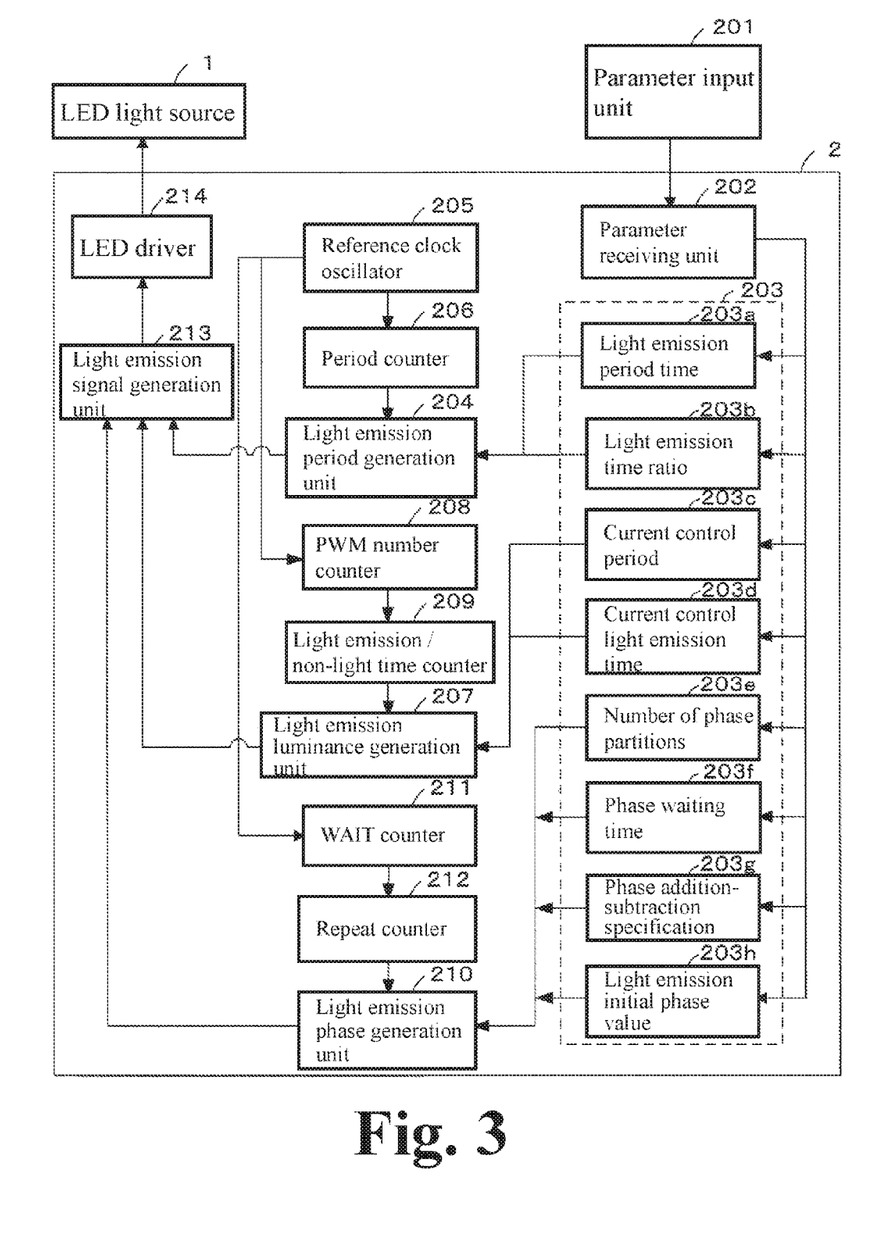
FIG. 3 is a block diagram showing a configuration of a light emission control device.

As shown in FIG. 3, in the light emission control device 2, based on various parameters input by the parameter input unit 201, a light emission period T is generated by the light emission period generation unit 204, a light emission luminance is generated by the light emission luminance generation unit 207, and after generating a plurality of light emission phases by the light emission phase generation unit 210, based on them, a light emission signal is generated by the light emission signal generation unit 213, and the LED light source is controlled by the LED driver 214. These can be configured by well-known logic circuits (FPGA, CPU, storage element, etc.) based on an oscillator such as a crystal oscillator having high frequency precision. The parameter input unit 201 is generally configured by a computer 100, such as, e.g., a personal computer (PC) having a keyboard and a display.

Hereinafter, the light emission control device 2 will be described in detail.

The reference numeral "202" denotes a parameter receiving unit (MUP, etc.), and is configured to receive parameters from the parameter input unit 201 and manage in the in-circuit memory.

The reference numeral "203" denotes a parameter setting unit, and is configured to set (store) various parameters sent from the parameter receiving unit 202 in the apparatus. These parameters include a light emission period time 203a, a light emission time ratio 203b, a current control period 203c, a current control light emission time 203d, the number of phase partitions 203e, a phase waiting time 203f, a phase addition-subtraction specification 203g, and an light emission initial phase value 203h.

Of these parameters, the light emission period time 203a and the light emission time ratio 203b are used to generate a light emission period T of the LED light source 1.

Figure 5A:
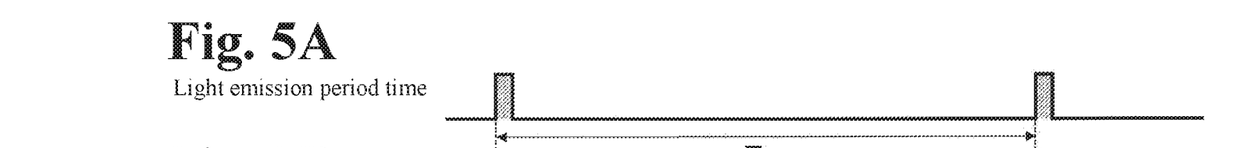
FIG. 5 is a diagram showing a relationship of a light emission period, etc., in a light emission control device.
Figure 5B:
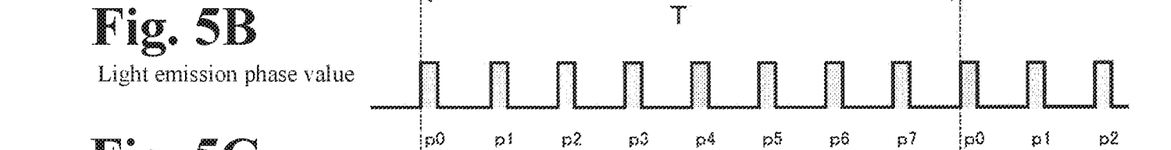

Specifically, as shown in FIG. 5A, the light emission period time 203a is a light emission period T of the LED light source 1 for synchronizing to the periodic motion of the observation target M.

The light emission time ratio 203b is a time ratio of light emission/non-light emission when the light emission period T is 100, and based on the time ratio, the light emission time t is determined.

These light emission period time 203a and the light emission time ratio 203b are output to the light emission period generation unit 204. As shown in FIG. 5A, this light emission period generation unit 204 generates a light emission period T (signal) of the LED light source 1 based on the set light emission period time 203a and the light emission time ratio 203b.

The reference numeral "206" denotes a reference clock oscillator that generates a high-speed basic clock signal using a quartz crystal resonator/oscillator. The reference numeral "207" denotes a period counter that generates a periodic signal by counting the basic clock. By the reference clock oscillator 206 and the period counter 207, it becomes possible for the light emission period generation unit 204 to generate, with high accuracy, a light emission period T.

Also, among the above-mentioned parameters, the current control period 203c and the current control light emission time 203d are used to generate a light emission luminance of the LED light source 1.

Specifically, the current control period 203c is used to further specify the light emission/non-light emission time ratio within the light emission time, and is a period when the light emission time is PWM controlled to control the light emission/non-light emission time ratio.

The current control light emission time 203d is a ratio of the light emission/non-light emission time within the light emission time for adjusting the light emission luminance.

Figure 6A:
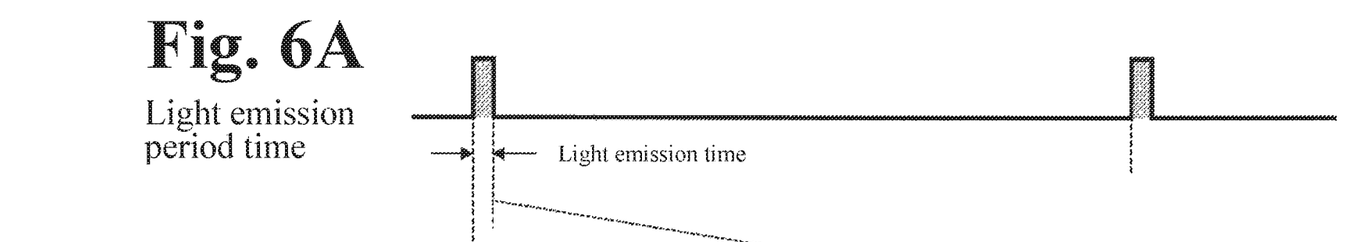
FIG. 6 is a diagram showing a relationship of a light emission period, etc., in a light emission control device.
Figures 6B, 6C:
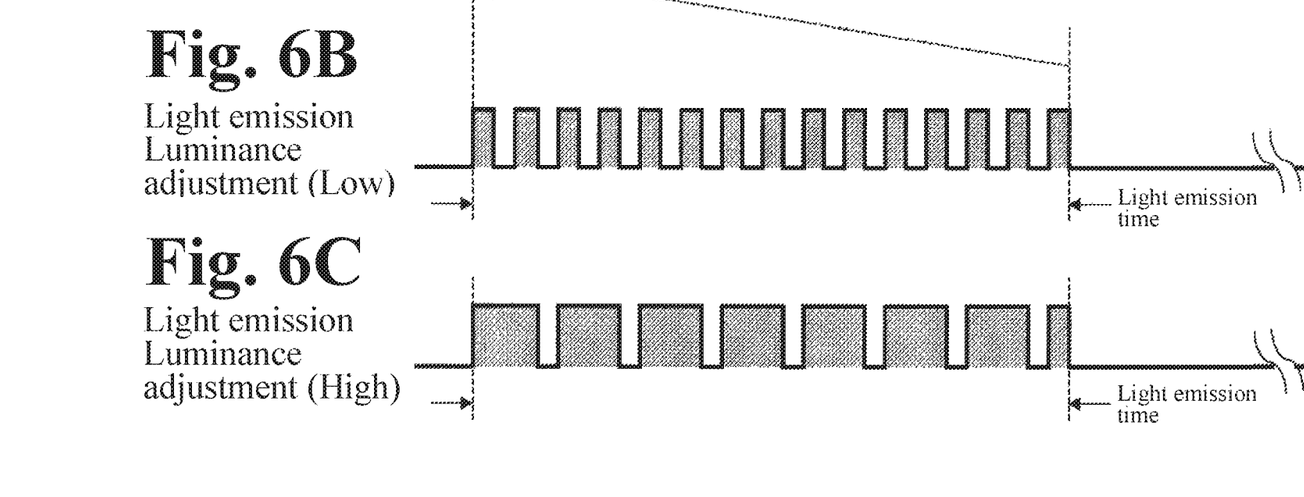

These current control period 203c and the current control light emission time 203d are output to the light emission luminance generation unit 207. As shown in FIG. 6, the light emission luminance generation unit 207 generates alight emission luminance (signal) of the light source based on the set current control period 203c and the current control light emission time 203d. For example, as shown in FIG. 6B, when the current control period 203c is shortened and the light emission time ratio 203b is decreased, the light emission luminance is decreased. Further, as shown in FIG. 6C, when the current control period 203c is increased in length, and the light emission time ratio 203b is increased, the light emission luminance is increased.

The reference numeral "208" denotes a PWM number counter that generates a period when the light emission time band is PWM controlled in the light emission time when adjusting the light emission luminance. Further, the reference numeral "209" denotes a counter of the ratio of the light emission/non-light emission time in the light emission time when the light emission time band is PWM controlled in the light emission time when adjusting the light emission luminance. With these PWM number counter and light emission/non-light emission time counter, the light emission luminance generation unit 207 becomes available to precisely generate the light emission luminance of the light source with high accuracy.

Among the above parameters, the number of phase partitions 203e, the phase waiting time 203f, the phase addition-subtraction specification 203g, and the light emission initial phase value 203h are used to obtain the light emission phase value p (in this embodiment, p0 to p7) which becomes the light emission start position P of the LED light source 1.

Specifically, the number of phase partitions 203e is the number of divisions when the light emission period T is divided into a plurality of light emission phases at an arbitrary magnification. With this, it becomes possible to move the light emission start position P in the light emission period T to a prescribed light emission phase value p, which enables to obtain alight emission start position P according to the number of phase partitions 203e in the light emission period T.

Further, the phase waiting time 203f is the time when the light emission start position P of the light source is made to wait at the prescribed light emission phase value p. When moving the light emission start position P of the LED light source 1 to a prescribed light emission phase value p in order by adding or subtracting the light emission phase sequentially according to the number of phase partitions 203e, the observation target M can be observed in slow motion state in which it slowly moves. However, even if the light emission phase is simply added or subtracted, when the frequency is high, the operation may not be slowed down to the sufficiently observable moving speed. For this reason, it is necessary to adjust the time by making the light emission start position P of light source wait at the same light emission phase value p, a waiting time is set at light emission phase value p.

Further, the phase addition-subtraction specification 203g is a specification of addition or subtraction when moving the light emission phase by adding or subtracting sequentially.

The light emission initial phase value 203h is an initial value of the light emission phase value p corresponding to the first light emission start position P. When the light emission initial phase value 203h is not specified, the initial light emission phase value p of the light emission period becomes the light emission initial phase value, but the initial phase value does not synchronize even if the observation target M and the LED light source 1 are the same in frequency. Therefore, an arbitrary light emission phase value p corresponding to the number of phase partitions 203e on the LED light source 1 side is specified, and it can be set to the initial light emission start position P as a light emission initial phase value 203h.

These number of phase partitions 203e, the phase waiting time 203f, the phase addition-subtraction specification 203g, and the light emission initial phase value 203h are output to the light emission phase generation unit 210. Based on the number of phase partitions 203e, the phase waiting time 203f, the phase addition-subtraction specification 203g, and the light emission initial phase value 203h, this light emission phase generation unit 210 divides the light emission period T to generate a plurality of light emission phases, and moves the light emission start position P of light source to prescribed light emission phase value p in order by adding or subtracting the light emission phase sequentially.

For example, as shown in FIG. 5, when the number of phase partitions 203e (N) is 8, in order to generate eight light emission phases by dividing the light emission period T, when the light emission phases are sequentially added or subtracted in the light emission period T according to the phase addition-subtraction specification, the light emission start position P of the light source can be sequentially moved to each of the eight light emission phase values p0 to p7. For example, FIG. 5C shows the case in which the light emission phase is 0, FIG. 5D shows the case in which the light emission phase is added by 1, and FIG. 5E shows a case in which the light emission phases are added by 2. The light emission start position P has been moved to each of the light emission phase values p1 and p2. As will be described later, the LED light source 1 emits at each light emission start position P sequentially moved to the prescribed light emission phase values p1 and p2.

The reference numeral "211" denotes a WAIT counter that generates a one-phase waiting time when a light emission phase is sequentially added or subtracted according to the number of phase partitions 203e. The reference numeral "212" denotes a repeat counter for generating a transfer movement range. With the WAIT counter and the repeat counter, the light emission phase generation unit 210 can move the light emission start position P to the prescribed light emission phase value p with high accuracy.

The light emission period T generated by the light emission period generation unit 204, the light emission luminance generated by the light emission luminance generation unit 207, the prescribed light emission phase value p by the light emission phase generation unit 210 are output to the light emission signal generation unit 213, respectively. The light emission signal generation unit 213, as shown in FIG. 5, generates a light emission signal that makes the LED light source 1 emit at a prescribed light emission luminance in turn based on these light emission period T, the light emission luminance, and the light emission phase value p, at each light emission start position P which moved sequentially to the prescribed light emission phase value p.

The light emission signal generated by the light emission signal generation unit 213 is output to the LED driver 214. The LED driver 214 converts the light emission signal generated by the light emission signal generation unit 213 into a driver signal of the LED light source 1 to make the LED light source 1 emit at a prescribed light emission period T, light emission luminance, and light emission phase value p.

[Operation of Light Emission Control Device 2]

Figure 8:
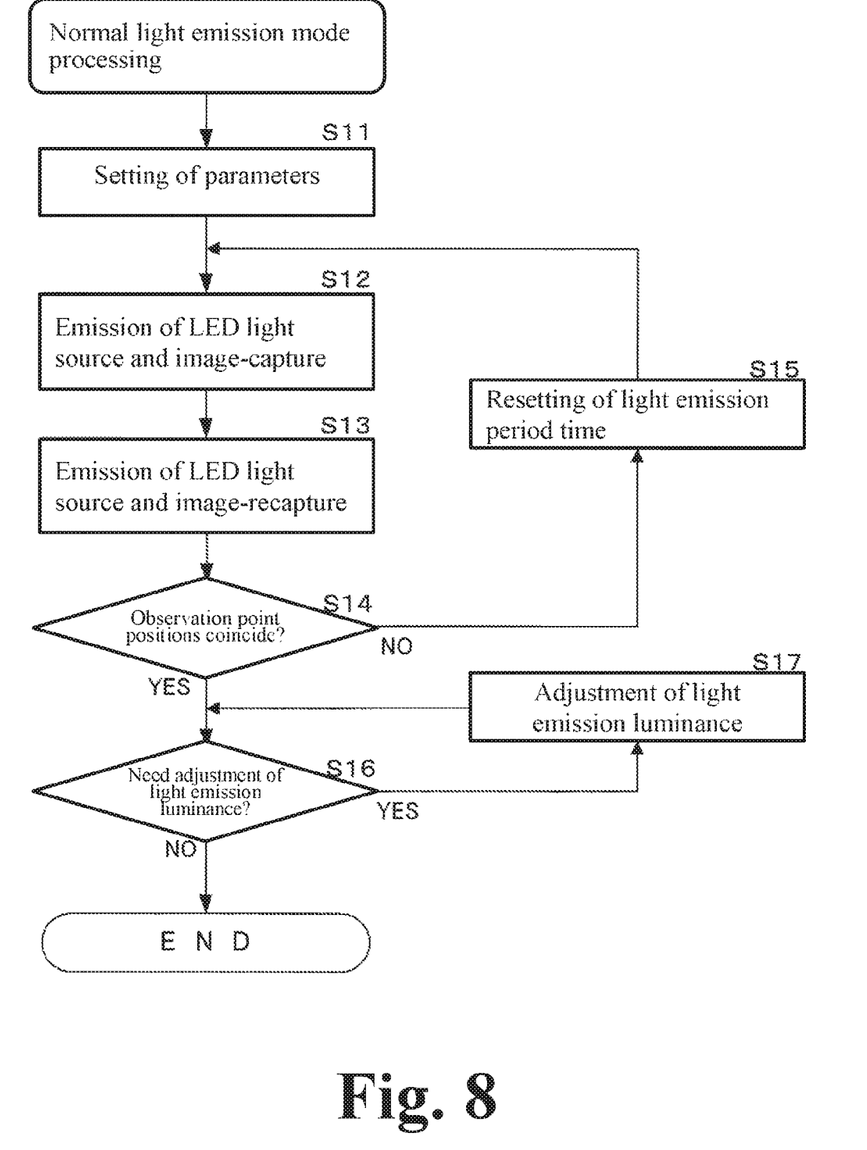
FIG. 8 is a flowchart showing a normal light emission mode process in a light emission control device.

FIG. 8 is a flowchart showing the process of the light emission control device 2 in a normal light emission mode.

In S11, various parameters of the light emission period time 203a, the light emission time ratio 203b, the current control period 203c, the current control light emission time 203d, the number of phase partitions 203e, the phase waiting time 203f, the phase addition-subtraction specification 203g, and the light emission initial phase value 203h are set (stored) in the setting unit 203, and the process proceeds to S12.

In S12, based on various parameters set in the parameter setting unit 203, the light emission period generation unit 204, the light emission luminance generation unit 207, and the light emission phase generation unit 210 generate the light emission period T, the light emission luminance, and the light emission phase value p, and then the light emission signal generation unit 213 generates a light emission signal based on the light emission period T, the light emission luminance, and the light emission phase value p, and makes the LED light source 1 emit via the LED driver 214. At this time, the image-capturing camera 3 images-captures the prescribed observation point of the observation target M irradiated by the LED light source 1 and the process proceeds to S13.

In S13, the image-capturing camera 3 re-images-captures the prescribed observation point of the observation target M irradiated by the LED light source 1 after the prescribed time has elapsed, and the process proceeds to S14.

In S14, it is judged whether or not positions of the two prescribed observation points image-captured by the image-capturing camera 3 coincide. When it is judged that the positions of the two prescribed observation points do not coincide (NO in S14), the process proceeds to S15. On the other hand, when it is judged that the positions of the two prescribed observation points coincide (YES in S14), the process proceeds to S16.

In S15, a periodic error is calculated from the movement amount of the observation point after the prescribed time has elapsed, the light emission period time 203a is reset, and the process returns to S12.

In S16, it is judged whether or not any adjustment of the light emission luminance of the light source is necessary, and when it is judged that any adjustment of light emission luminance of the light source is not necessary (NO in S16), the present process is terminated. On the other hand, when it is judged that some adjustment of the light emission luminance of the light source is necessary (YES in S16), the process proceeds to S17.

In S17, in order to adjust the light emission luminance of the light source, the current control period 203c and the current control light emission time 203d are reset, and the process returns to S16.

Figure 9:
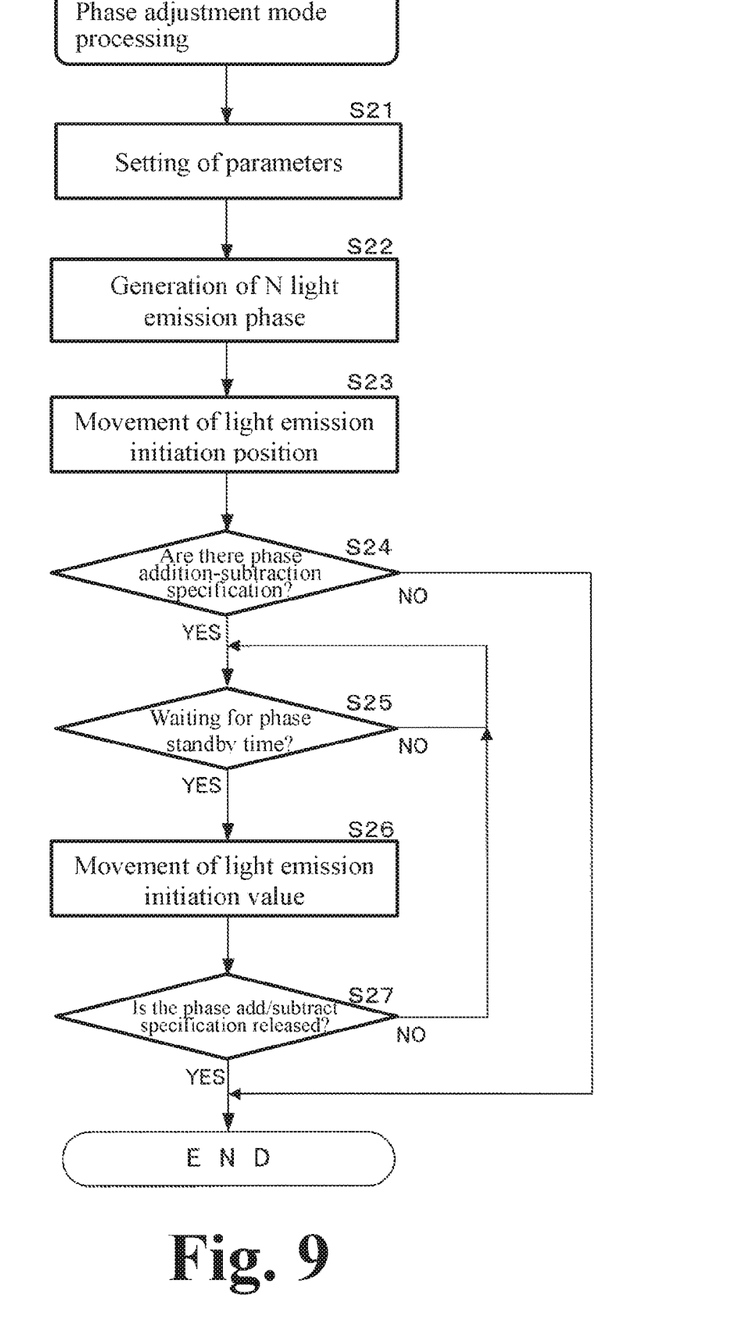
FIG. 9 is a flowchart showing a phase addition-subtraction mode process in a light emission control device.

FIG. 9 is a flowchart showing the process of the phase addition-subtraction mode of the light emission control device 2.

In S21, various parameters of the number of phase partitions 203e, the phase waiting time 203f, the phase addition-subtraction specification 203g, and the light emission initial phase value 203h are set (stored) in the parameter setting unit 203, and the process proceeds to S22.

In S22, the light emission phase generation unit 210 equally divides the light emission period T into the number of phase partitions 203e, and generates N light emission phases in the light emission period T, and the process proceeds to S23.

In S23, the light emission phase generation unit 210 moves the light emission start position P to the light emission phase value p0 corresponding to the light emission initial phase value 203h, and then the process proceeds to S24.

In S24, the light emission phase generation unit 210 judges whether or not there is a phase addition-subtraction specification 203g. When it is judged that there is a phase addition-subtraction specification 203g (YES in S24), the process proceeds to S25. When it is judged that addition-subtraction specification 203g does not exist (NO in S24), this process is terminated.

In S25, the light emission phase generation unit 210 judges whether or not it has waited for the phase waiting time 203f. When it is judged that it has waited for the phase waiting time 203f (YES in S25), the process proceeds to S26. On the other hands, when it is judged that it has not waited for the waiting time 203f (NO in S25), the process of S25 is repeated.

In S26, the light emission phase generation unit 210 sets the light emission phase to +1 in the case of the phase addition specification, sets the light emission phase to −1 in the case of the phase subtraction specification, and move the light emission start position P by one light emission phase, and the process proceeds to S27. The case in which the phase addition-subtraction specification 203g moves only by one light emission phase is described above, however, it may move by two or more light emission phases.

In S27, the light emission phase generation unit 210 judges whether or not there is a release of the phase addition-subtraction specification 203g, and when it is judged that there is a release of the phase addition-subtraction specification 203g (YES in S27), the process is terminated. On the other hand, when it is judged that there is no release of the phase addition-subtraction specification 203g (NO in S27), the process returns to S24 to repeat the processes of S24 to S27.

Figure 10:
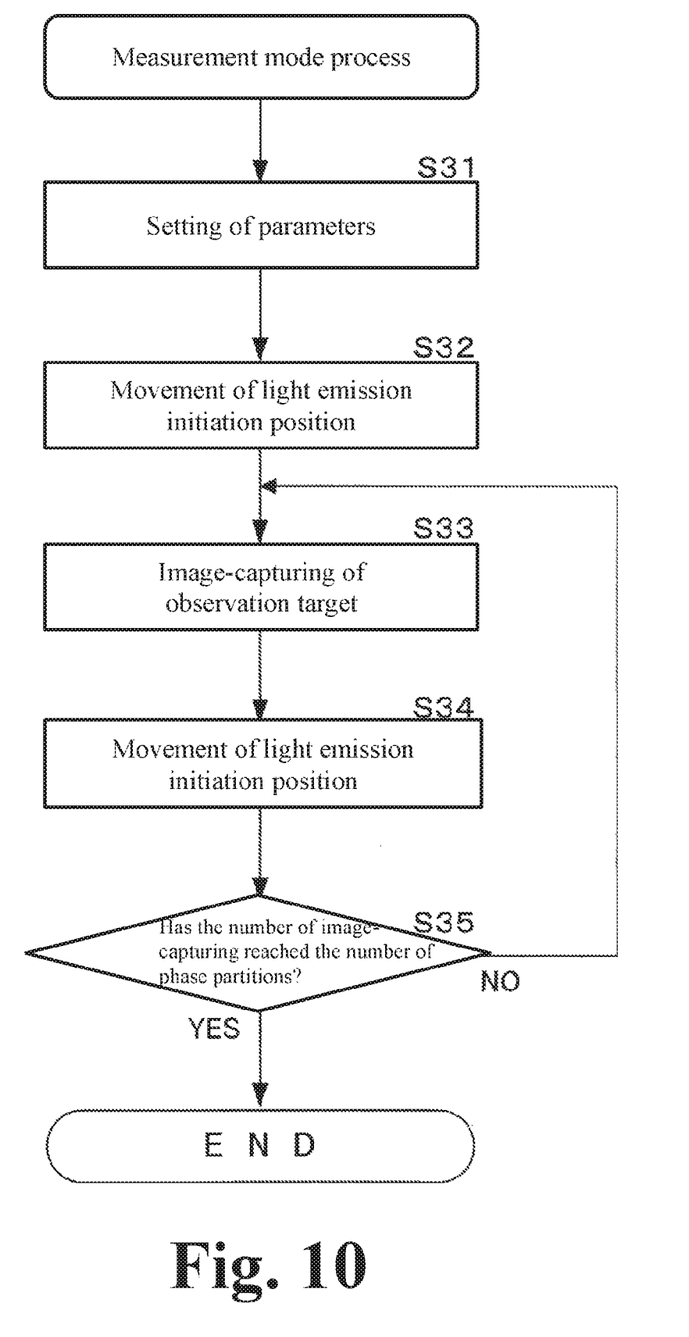
FIG. 10 is a flowchart showing a measurement mode process in a light emission control device.

FIG. 10 is a flowchart showing the process of the measurement mode of the light emission control device 2.

In S31, various parameters of the number of phase partitions 203e, the phase addition-subtraction specification 203g, and the light emission initial phase value 203h are set (stored) in the parameter setting unit 203, and the process proceeds to S32.

In S32, the light emission phase generation unit 210 moves the light emission start position P to the light emission initial phase value p0, and the process proceeds to S33.

In S33, the image-capturing camera 3 images-captures the prescribed observation point of the observation target M irradiated by the LED light source 1, and the process proceeds to S34.

In S34, in the case of the phase addition specification, the light emission phase is set to +1, in the case of the phase subtraction specification, the light emission phase is set to −1, the light emission start position P is moved by one light emission phase, and the process proceeds to S35. The case in which the phase addition-subtraction specification 203g moves the phase only by one phase is described above, but two or more phases may be moved.

In S35, it is judged whether or not the number of image-capturing of the prescribed observation point of the observation target M by the image-capturing camera 3 has reached the number of phase partitions 203e. When it is judged that the number of image-capturing times has reached the number of phase partitions 203e (YES in S35), the process is terminated. On the other hand, when it is judged that the number of image-capturing times has not reached the number of phase partitions 203e (NO in S35), the process returns to S33 and the processes of S33 to S35 are repeated.

With this, as shown in FIG. 5, since the image-capturing camera 3 image-captures the prescribed observation point of the observation target M in each light emission phase value p in the light emission period T, a plurality of images corresponding to the number of phase partitions 203e can be obtained. The plurality of images related to the prescribed observation point of the observation target M image-captured by the image-capturing camera 3 are sent to the image analysis device 4 and used for image analysis.

[Configuration of Image Analysis Device 4]

Figure 4:
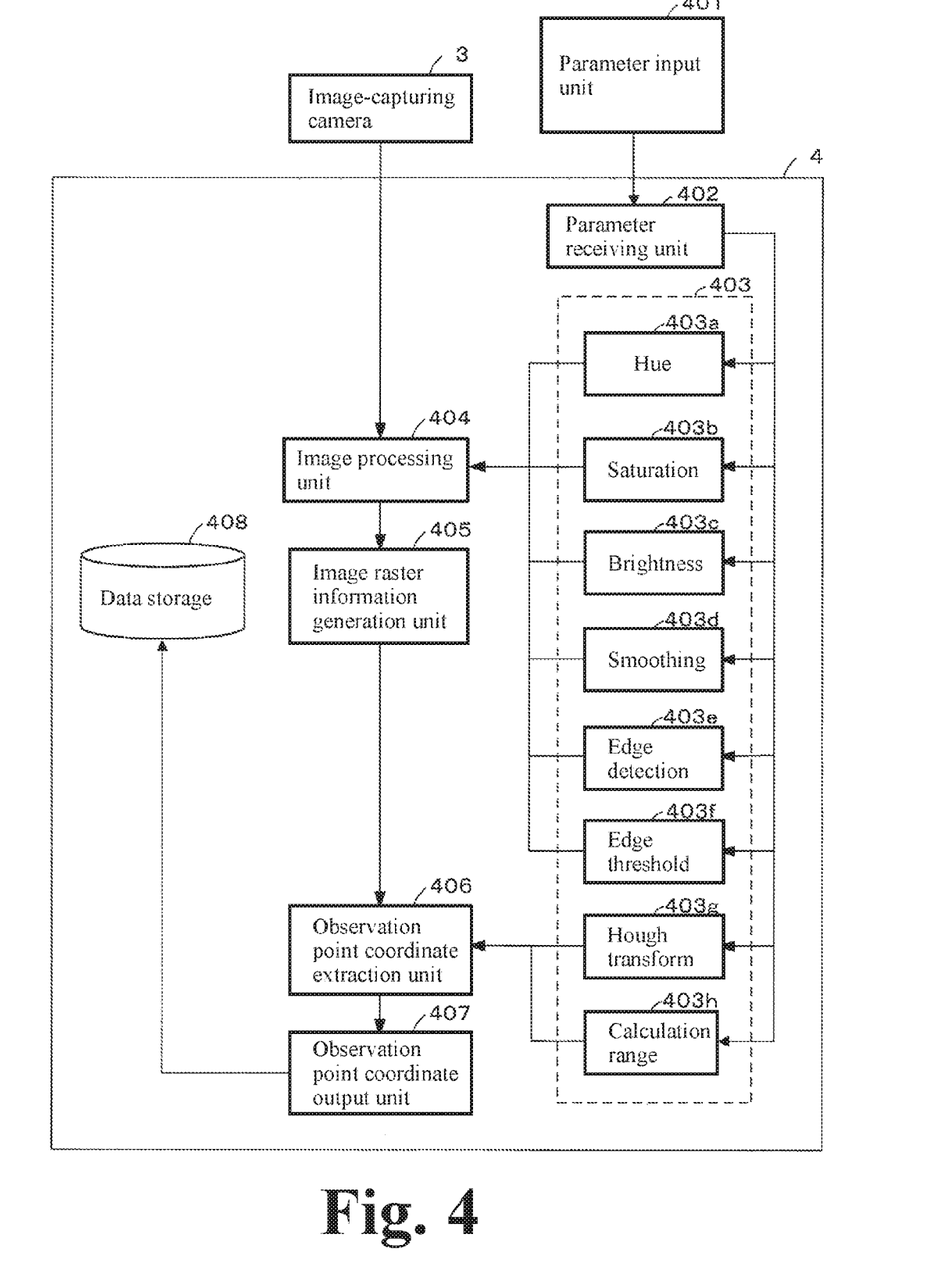
FIG. 4 is a block diagram showing a configuration of an image analysis device.
Figure 5C:
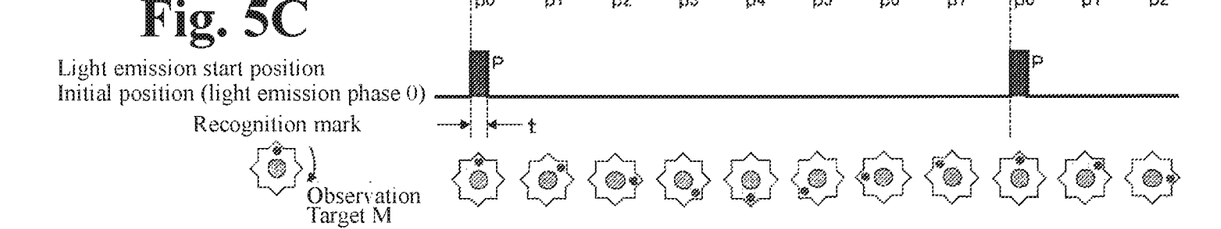
Figure 5D:
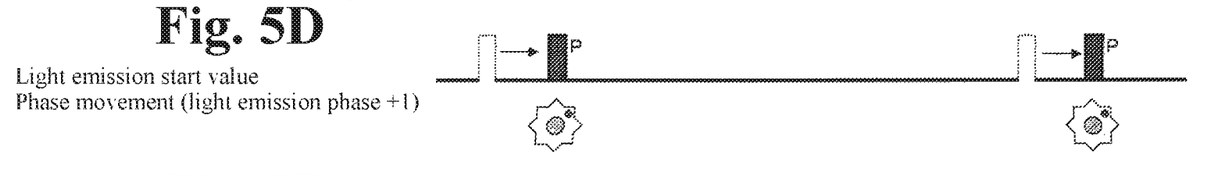
Figure 5E:
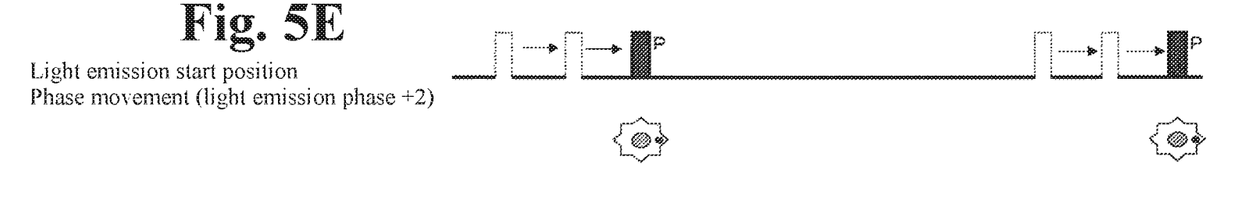

As shown in FIG. 4, the image analysis device 4 extracts the coordinate of the prescribed observation point of the observation target M image-captured by the image-capturing camera 3 based on various parameters input by the parameter input unit 410, and then outputs each coordinate in tabular form or graphic form. The image analysis device 4 is configured by a computer 100, such as, e.g., a personal computer (PC) having a keyboard and a display, and the parameter input unit 410 is the keyboard. In this embodiment, as the prescribed observation point of the observation target M, as shown in FIG. 5C, the recognition mark (the black circle portion on the observation target M) previously provided on the observation target M is used.

Hereinafter, the image analysis device 4 will be described in detail.

The reference numeral "402" denotes a parameter receiving unit 402, which receives parameters from the parameter input unit 410 and manages them in the in-circuit memory.

The reference numeral "403" is a parameter setting unit, which sets (stores) the parameters sent from the parameter receiving unit 402. These parameters include the hue 403a, the saturation 403b, the brightness 403c, the smoothing 403d, the edge detection 403e, the edge threshold 403f, the Hough transform 403g, and the calculation range 403h.

Of these parameters, the hue 403a, the saturation 403b, the brightness 403c, the smoothing 403d (presence or absence), the edge detection 403e (presence or absence), and the edge threshold 403f are used to rasterize the image related to the prescribed observation point (recognition mark) of the observation target M image-captured by the image-capturing camera 3.

Specifically, the hue 403a is one of attributes of color, which is a difference in color such as red or yellow. Although the hue 403a varies depending on its classification method, there are red, yellow, green, blue, violet, etc., as major hues 403a. Further, the saturation 403b is one of three affinities of color, and is a measure of color vividness. Further, the brightness 403c is an index of the brightness (degree of shine) of the LED light source 1.

The smoothing 403d is a process of smoothing the image to obtain an easy-to-see image by removing random noise on the image and reducing small changes in the density value of each pixel.

The edge detection 403e is a process of detecting the edge of an image like a Canny method. The edge threshold 403f is a threshold value for detecting an edge.

These hue 403a, saturation 403b, brightness 403c, smoothing 403d (presence or absence), edge detection 403e (presence or absence), edge threshold 403f are output to the image processing unit 404. This image processing unit 404 processes the image, based on the hue 403a, the saturation 403b, the brightness 403c, the smoothing 403d (presence or absence), the edge detection 403e (presence or absence), the edge threshold 403f, so that the recognition mark which is the observation point can be easily extracted from each image related to the observation point of the observation target M image-captured by the image-capturing camera 3, and thereafter outputs to the image rasterizing unit 405.

The image rasterizing unit 405 initially scans a two-dimensional original image one-dimensionally at a point, then scans it at a line in a direction perpendicular thereto to obtain an analysis image in a two-dimensional plane. In order to perform this raster scan, image processing may be performed by converting the original image to a file format, such as, bmp, png, jpeg, etc., if necessary. These analysis images are output to the data storage 408 by specifying the save directory and the file name inside or outside the PC.

On the other hand, among these image analysis parameters, the Hough transform 403g and the calculation range 403h are used to extract the coordinate from the image related to the prescribed observation point (recognition mark) of the observation target M image-captured by the image-capturing camera 3.

Specifically, the Hough transform 403g is one of feature extraction methods for digital image processing, and mainly detects straight lines. Also, the calculation range 403h specifies the range for image analysis.

These Hough transform 403g (presence or absence) and the calculation range 403h are output to the observation point coordinate extraction unit 406. This observation point coordinate extraction unit 406 extracts the coordinate of the prescribed observation point (recognition mark) of the observation target M while considering the Hough transform 403g and the calculation range 403h, based on the analysis image output from the image rasterizing unit 405.

For example, the observation point coordinate extraction unit 406 extracts the prescribed observation point (recognition mark) of the observation target M by converting the centroid and angle of each position into data by the calculation range 403h. This extraction of the centroid is to extract the average coordinate of the effective pixel positions, and in cases where the recognition mark is a mark having an area, such as, e.g., o and Δ, in some cases, it is difficult to recognize the shape, such as when the observation target M rotates, and therefore the centroid is extracted. Further, in extracting a straight line, when the center of rotation of the observation target M is settled, a straight line passing through the center when measuring the moving angle is taken as a recognition mark, and the central angle is measured from the coordinate data of the center and the straight line. In this embodiment, the centroid and the straight line are used to extract the coordinate of the prescribed observation point (recognition mark), but the coordinates of the prescribed observation point (recognition mark) may be used by other methods.

Figure 7A:
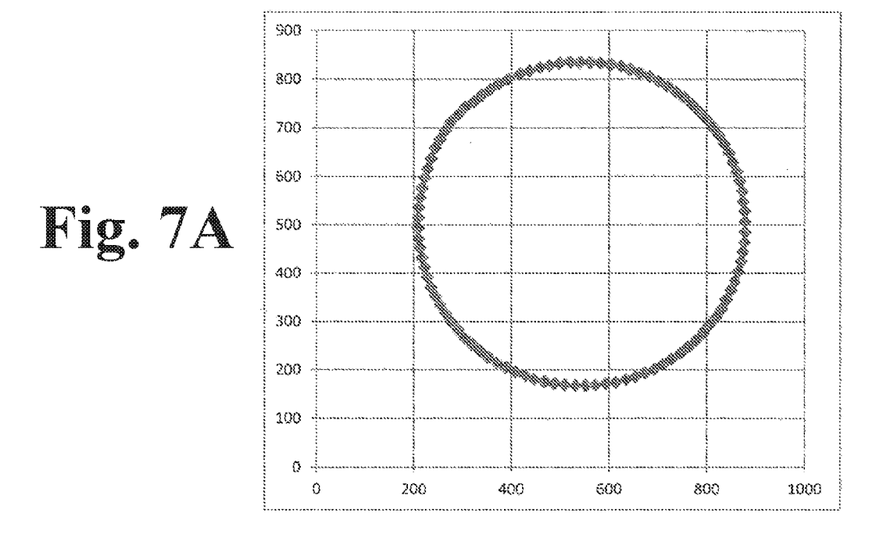
FIG. 7 is a graphic showing coordinates of an observation point in graphic form in an image analysis device.
Figure 7B:
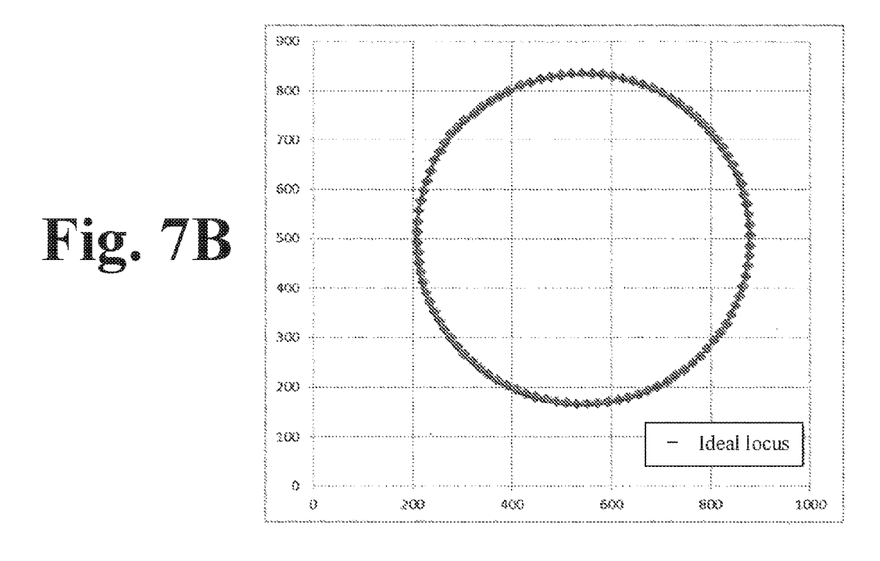

The coordinate of the observation point (recognition mark) extracted by this observation point coordinate extraction unit 406 is output to the observation point coordinate output unit 407. The observation point coordinate output unit 407 outputs the coordinate of the observation point (recognition mark) extracted by the observation point coordinate extraction unit 406 in tabular form, and further, as shown in FIG. 7A, each coordinate of the observation point (recognition mark) is output in graphic form by plotting on Excel, etc. At this time, as shown in FIG. 7B, the coordinate data extracted from the image data and the ideal locus data (circular solid line) may be superimposed and displayed, for example, in a comparable state. The coordinates output in these tabular form and/or graphic form are saved by the data storage 408.

The data storage 408 is configured to save various data, etc., generated in the process, such as, e.g., an analysis image image rasterized by the image rasterizing unit 405 and a coordinate output in tabular form or graphic form by the observation point coordinate output unit 407. Various saved data, etc., are appropriately displayed on the display unit by a user's operation of a keyboard or the like.

[Operation of Image Analysis Device 4]

Figure 11:
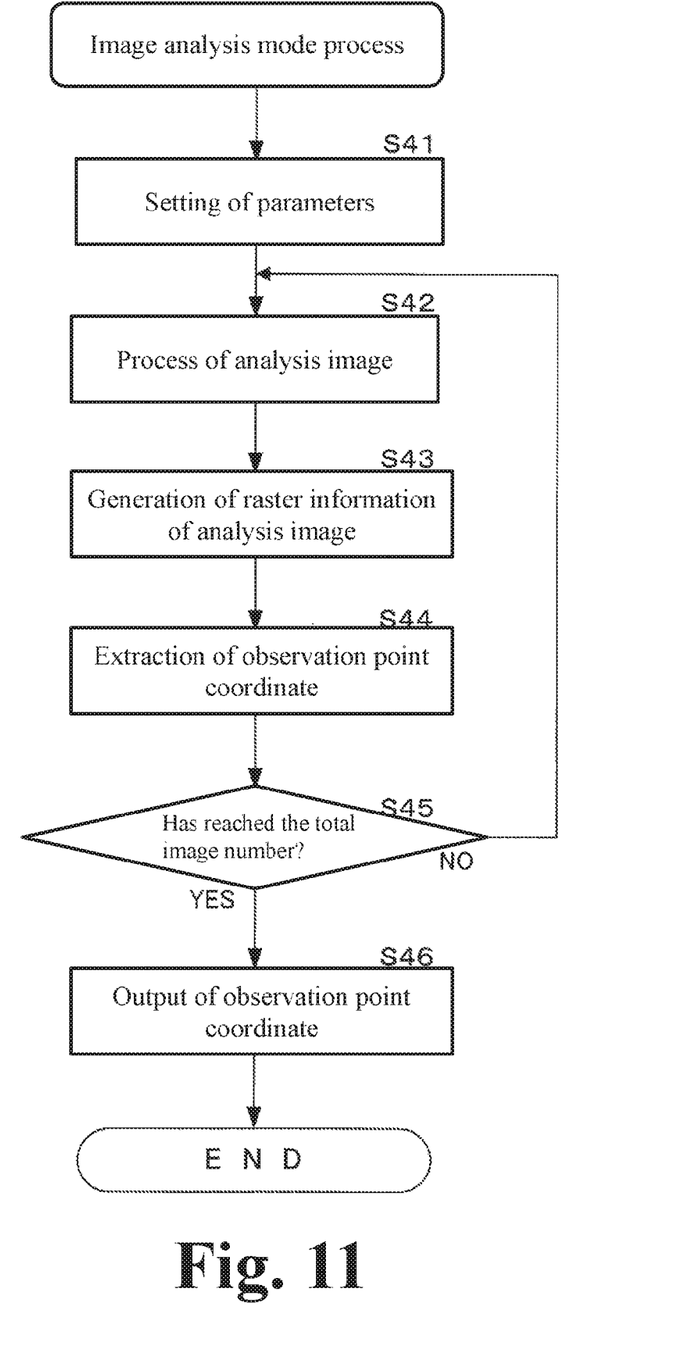
FIG. 11 is a flowchart showing an analysis process in an image analysis device.

FIG. 11 is a flowchart showing the processing of the light emission analyzer in the analysis mode.

In S41, various parameters of the hue 403a, the saturation 403b, the brightness 403c, the smoothing 403d, the edge detection 403e, the edge threshold 403f, the Hough transform 403g, and the calculation range 403h are set in the parameter setting unit 403, and the process proceeds to S42.

In S42, the image processing unit 404 processes the image, based on the hue 403a, the saturation 403b, the brightness 403c, the smoothing 403d (presence or absence), the edge detection 403e (presence or absence), and the edge threshold 403f, so that the recognition mark which is the observation point can be easily extracted from each image related to the observation point of the observation target M image-captured by the image-capturing camera 3, and thereafter outputs to the image rasterizing unit 405. Then, the process proceeds to S43.

In S43, the image rasterizing unit 405 initially scans a two-dimensional original image one-dimensionally at a point, then scans it at a line in a direction perpendicular thereto to obtain an analysis image in a two-dimensional plane. Then, the process proceeds to S44.

In S44, the observation point coordinate extraction unit 406 extracts the coordinate (centroid and straight line) of the prescribed observation point (recognition mark) of the observation target M while considering the Hough transform 403g and the calculation range 403h, based on the analysis image output from the recognition mark rasterizing unit. Then, the process proceeds to S45.

In S45, it is judged whether or not the processed image has reached the total number of images corresponding to the number of phase partitions 203e. When it is judged that the total number of images has reached (YES in S45), the process proceeds to S46. On the other hand, if it is judged that the total number of images has not reached (NO in S45), the process returns to S42 and the processes of S42 to S45 are repeated for the next image.

In S46, the observation point coordinate output unit 407 outputs the coordinate of the observation point extracted by the observation point coordinate extraction unit 406 in tabular form, and further, as shown in FIG. 7, each coordinate of an observation point (recognition mark) is output in graphic form by plotting on Excel, etc. At this time, as shown in FIG. 7B, the coordinate data extracted from the image data and the ideal locus data (circular solid line) may be superimposed and displayed, for example, in a comparable state.

As described above, it is possible to observe the periodic motion of the observation target M with simple configuration without using an expensive apparatus, such as, e.g., a high speed camera. Also, since each coordinate of the observation point of observation target M is output in tabular form or graphic form, it is possible to identify, with high accuracy, the locus, the speed, the position where strain, etc., has occurred on the periodic motion of the observation target M. It is possible to find various abnormalities of the observation target M and easily and reliably investigate the cause of the abnormality while keeping the cost low.

In this embodiment, a DC motor is exemplified as the observation target M, but the present invention is not limited to this. The observation target may be any type of observation target so long as it moves with a periodic motion, such as, e.g., a printer or a fuel ejecting apparatus in which liquid droplets are ejected at a constant period and fly at prescribed speed.

Although the embodiments of the present invention have been described with reference to the drawings, the present invention is not limited to the illustrated embodiments. Various modifications and variations can be made to the illustrated embodiment within the same scope of the present invention or within the equivalent scope.

DESCRIPTION OF THE REFERENCE SYMBOLS

1 LED light source
2 light source control device 201 parameter input unit
202 parameter receiving unit
203 parameter setting unit
204 light emission period generation unit
207 light emission luminance generation unit
210 light emission phase generation unit
213 light emission signal generation unit
214 LED driver
3 image-capturing camera
4 image analysis device
401 parameter input unit
402 parameter receiving unit
403 parameter setting unit
404 image processing unit
405 image rasterizing unit
406 observation point coordinate extraction unit
407 observation point coordinate output unit
408 data storage

The invention claimed is:

1. A periodic motion observation system comprising:
   a light source configured to emit a flash light every prescribed period to irradiate an observation target in a periodic motion;
   a light emission control device configured to control emission of the light source;
   an image-capturing camera configured to image-capture the periodic motion of a prescribed observation point of the observation target irradiated by the light source; and
   an image analysis device configured to analyze an image of the periodic motion of the prescribed observation point of the observation target image-captured by the image-capturing camera,
   wherein the light emission control device includes
   a light emission period generation unit configured to generate a light emission period of the light source to synchronize to the periodic motion of the observation target,
   a light emission phase generation unit configured to generate a plurality of light emission phases by dividing the light emission period of the light source and add or subtract the light emission phases to thereby move a light emission start position of the light source to a prescribed light emission phase value in order, and
   a light emission signal generation unit configured to generate a light emission signal that sequentially makes the light source emit at each light emission start position sequentially moved to the prescribed light emission phase value by the light emission phase generation unit in the light emission period generated by the light emission period generation unit, and
   wherein the image analysis device includes
   an observation point coordinate extraction unit configured to extract a coordinate of the observation point when the prescribed observation point of the observation target is irradiated by the light source based on the image related to the periodic motion of the prescribed observation point of the observation target image-captured by the image-capturing camera, and
   an observation point coordinate output unit configured to output each coordinate of the prescribed observation point of the observation target extracted by the observation point coordinate extraction unit in tabular form or graphic form.

2. The periodic motion observation system as recited in claim 1,
   wherein the light emission control device includes a light emission luminance generation unit that generates light emission luminance of the light source by adjusting a light emission time ratio within a light emission time of the light source, and the light emission luminance generated by the light emission luminance generation unit is output to the light emission signal generation unit.

3. The periodic motion observation system as recited in claim 1,
   wherein the light emission phase generation unit of the light emission control device makes the light emission start position of the light source wait at the prescribed light emission phase value based on a prescribed phase waiting time.

4. The periodic motion observation system as recited in claim 1,
   wherein the light emission phase generation unit of the light emission control device specifies the light emission phase value corresponding to an initial light emission start position of the light source according to an initial phase value of the motion period of the observation target.

5. The periodic motion observation system as recited in claim 1,
   wherein the image analysis device includes an image processing unit that processes the image related to the periodic motion of the observation point of the observation target image-captured by the image-capturing camera to obtain an analysis image based on at least one of parameters of a hue, a saturation, a brightness, a presence or absence of smoothing, a presence or absence of edge detection, and an edge threshold.

6. The periodic motion observation system as recited in claim 1,
   wherein the image analysis device includes an image rasterizing unit that obtains an analysis image on a two-dimensional surface by one-dimensionally scanning an image related to the periodic motion of the observation point of the observation target image-captured by the image-capturing camera at a point and then scanning at a line in a direction perpendicular to the one-dimensional scanning.

* * * * *